United States Patent [19]

van Bogaert

[11] 4,308,887
[45] Jan. 5, 1982

[54] GAS DAMPER

[75] Inventor: Joseph R. van Bogaert, Louisville, Ky.

[73] Assignee: American Air Filter Company, Inc., Louisville, Ky.

[21] Appl. No.: 190,917

[22] Filed: Sep. 26, 1980

[51] Int. Cl.³ .............................................. G05D 11/03
[52] U.S. Cl. ............................. 137/112; 137/533.27; 137/534; 137/538
[58] Field of Search ........... 137/112, 113, 532, 533.17, 137/533.27, 534, 538, 543.15

[56] References Cited

U.S. PATENT DOCUMENTS

| | | | |
|---|---|---|---|
| 455,913 | 7/1891 | Walker | 137/534 |
| 2,665,877 | 1/1954 | McGregor | 137/533.17 |
| 4,230,174 | 10/1980 | Eubank | 137/112 X |

FOREIGN PATENT DOCUMENTS

| | | | |
|---|---|---|---|
| 15903 | of 1928 | Australia | 137/533.27 |
| 2401285 | 7/1974 | Fed. Rep. of Germany | 137/538 |
| 12507 | of 1898 | United Kingdom | 137/534 |

Primary Examiner—Robert G. Nilson
Attorney, Agent, or Firm—Thomas G. Anderson

[57] ABSTRACT

A gas damper for regulating the mass flow of a stream of purging air as it is directed into an electrostatic precipitator including a generally cylindrical housing having a floating piston positioned in metering relationship to the discharge outlet of the housing by the buoyant force of the air flowing through the housing.

5 Claims, 5 Drawing Figures

GAS DAMPER

BACKGROUND OF THE INVENTION

1. Field of Invention

The present invention relates to a gas damper and in particular to a damper for regulating a purging airstream as it is directed into an electrostatic precipitator.

2. Description of the Prior Art

In the typical electrostatic precipitator used to remove fly ash and other particulates from the stack gases of an electrical power plant, the discharge electrodes are suspended from a series of electrical insulators mounted on the roof of the precipitator. Each of the insulators is enclosed by a separate housing which is maintained at a pressure slightly above the pressure of the flue gases flowing through the precipitator to prevent an accumulation of the corrosive flue gases about the insulators. This is accomplished by directing a preheated purging stream of ambient air into each of the insulator housings through a series of ducts connected to a forced air blower mounted on the roof of the precipitator. While this type of arrangement protects the insulators from the corrosive flue gases, experience has shown that the air flow into the insulator housings must be very closely controlled. For example, if the flow rate is too low, the flue gases migrate into the insulator housings where they are cooled to the point that sulfuric acid and the like begins to condense out of the gases and collect on the insulators, or alternatively, if the flow rate is too high, the purging air tends to cool the interior of the precipitator which leads to a corrosive acid rain within the precipitator. In the past, it has been the practice to provide electronic sensors which measure the flue gas pressure in the interior of the precipitator and in turn signal an electrically actuated damper which adjusts the air flow accordingly. While this type of arrangement has proven to be satisfactory, it is expensive as well as being relatively difficult to adjust and repair in the field.

SUMMARY OF THE INVENTION

The present invention relates to a gas damper and in particular to a damper for regulating the mass flow of a stream of purging air as it is directed into an electrostatic precipitator.

The damper is connected with a forced air blower to maintain a constant mass flow of purging air into the insulator housings of an electrostatic precipitator as the pressure of the flue gases passing through the precipitator varies during operation of the precipitator. The damper includes a generally cylindrical housing, a floating piston mounted within the cylindrical housing, a gas inlet at one end of the cylindrical housing connected with the forced air blower, a gas outlet in the side of the cylindrical housing connected with the insulator housings, and biasing means urging the floating piston toward the inlet. During operation of the precipitator, the piston is selectively displaced within the housing by the buoyant force of the gas stream flowing through the housing to position it in partial covering relationship with the outlet to meter the discharge rate of the gas commensurate with the pressure of the flue gases in the precipitator.

From the foregoing, it can be seen that the invention contemplates an easily fabricated and relatively inexpensive damper arrangement which is particularly suited for adjustment in the field; however, it is to be understood that various changes can be made in the arrangement, form and construction of the apparatus disclosed herein without departing from the scope and spirit of the invention.

DESCRIPTION OF THE PREFERRED EMBODIMENT

Figure 1:
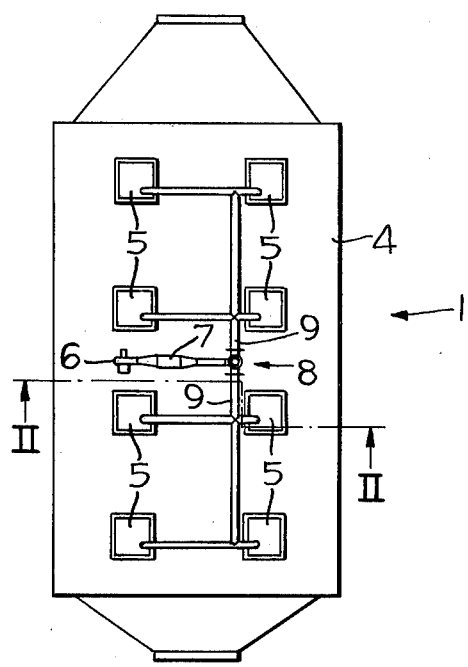
FIG. 1 is a plan view of an electrostatic precipitator incorporating the gas damper embodying the invention.
Figure 2:
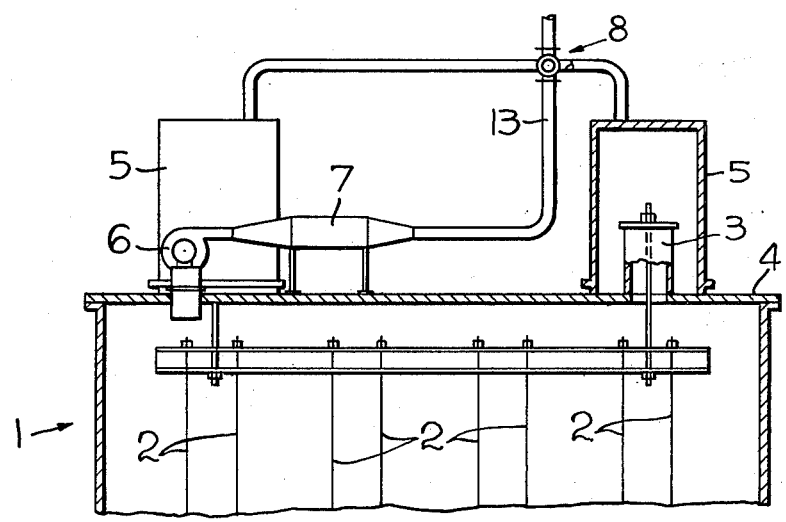
FIG. 2 is an enlarged partial cross-sectional view taken substantially along line II—II in FIG. 1.
Figure 4:
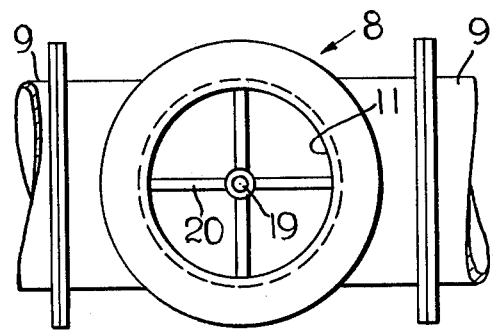
FIG. 4 is a top view of the gas damper.

FIGS. 1 and 2 show an electrostatic precipitator 1 for removing fly ash and other particulates from stack gases of an electrical power plant or the like. The precipitator 1 includes a plurality of discharge electrodes 2 suspended from a series of electrical insulators 3 mounted on the roof 4 of the precipitator. Each of the insulators 3 is enclosed by a separate housing 5 which is also mounted on the roof 4, and to prevent a backflow or accumulation of corrosive flue gases about the insulators 3, the interior of each housing 5 is maintained at a pressure slightly above the pressure of the flue gas stream flowing through the interior of the precipitator. As shown in the drawings, a forced air fan or blower 6 is connected through a conventional gas preheater 7 to the mass flow control damper 8 which is connected by ducts 9 to each of the insulator housings 5. This arrangement accommodates the direction of a constant stream of ambient air into each of the housings to maintain a positive pressure differential between the insulator housings and the interior of the precipitator.

Figure 3:
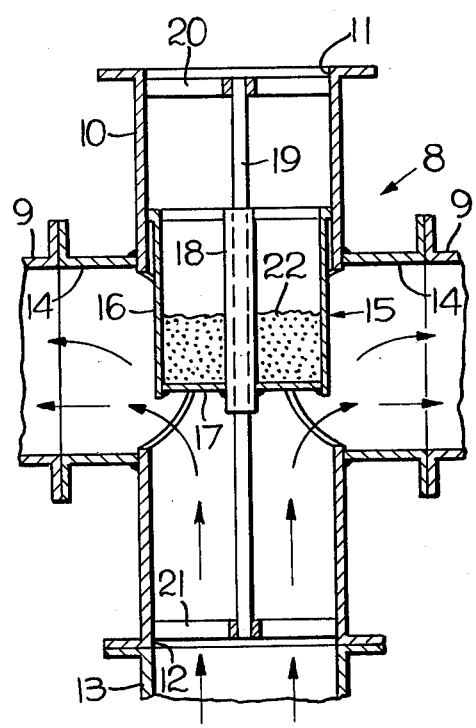
FIG. 3 is an enlarged cross-sectional view of the gas damper in its normal flow metering configuration.

As shown in FIG. 3, the damper 8 is preferably of a welded metal construction and includes a generally vertically-aligned cylindrical housing 10 having an upper inlet 11 vented to the atmosphere, a lower inlet 12 connected to ducting 13 from the preheater 7, and a pair of opposing discharge outlets 14 connected to the ducts 9. As will be described, a hollow piston or plunger 15 is reciprocably supported within the cylindrical housing 10 to meter the air flow as it leaves the housing 10 through the discharge outlets 14. The piston 15 includes an outer tubular wall 16, a circular head plate 17, and a tubular sleeve 18 carried on a spindle or guide rod 19 centrally aligned and supported between the ends of the housing 10 by a pair of spider-like supporting brackets 20 and 21 secured in the ends of the housing. Additionally, it should be noted that the hollow interior of the piston 14 is filled with predetermined quantity of buckshot or other ballast 22 to bias it toward the lower inlet 12, although it is to be undersood that a compression spring or related mechanical arrangement could be used for this purpose.

During operation of the precipitator, the pressure in the airstream flowing through the housing buoys or lifts the piston 15 to uncover the discharge outlets 14 which feed into the ducts 9 connected with the insulator housings 5. It can be seen that by biasing the piston toward the lower inlet 12, the arrangement provides for maintaining a relatively constant mass flow of ambient air through the damper into the insulator housings. For example, if the pressure of the flue gases in the precipitator increases, the increased pressure raises the piston 15 to further uncover or enlarge the discharge outlets 14 until the pressure at the fan 6 balances the piston weight, and conversely, a decrease in the pressure of the flue gases lowers the piston until there is a balance between the weight of the piston and the fan pressure. If it is desired to raise the operating pressure of the damper, a workman simply pours more buckshot into the hollow interior of the piston. Similarly, if the operating pressure is to be lowered, the workman simply removes some of the buckshot.

Figure 5:
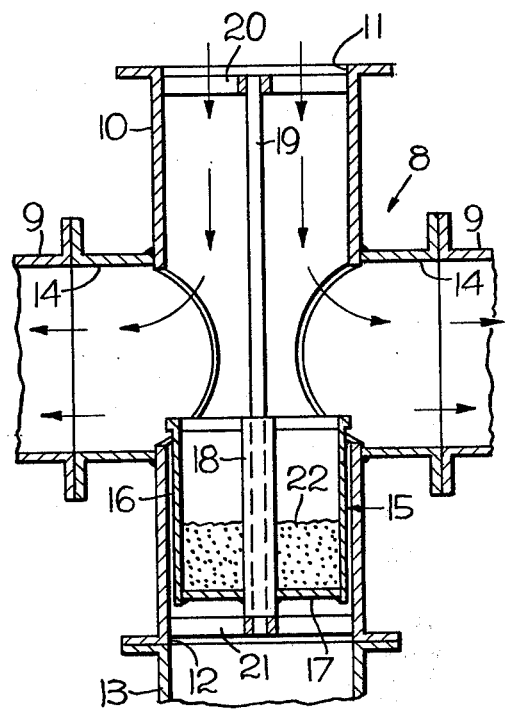
FIG. 5 is a cross-sectional view of the gas damper similar to FIG. 3 showing the damper in its bypassing configuration.

In the event the fan stops or fails during operation of the precipitator, the invention also provides for a by-passing flow of ambient air through the damper to maintain a stream of purging air flowing into the insulator housings until the fan can be restarted or the precipitator is shut down. As shown in FIG. 5, when the fan stops, the piston 15 drops to the base of the cylindrical housing 10 and closes off the lower inlet 12 while opening the discharge outlets 14 to the atmosphere through the upper inlet 11. Thus, since the operating pressure within the precipitator is generally about 3-5 inches water gauge below the ambient pressure during normal operation of the precipitator, a stream of purging air is drawn into the insulator housings as indicated by the arrows shown in FIG. 5.

The embodiments of the invention in which an exclusive property or privilege is claimed are defined as follows:

1. A gas stream damper adapted to regulate the flow of a first gas stream and direct a second gas stream through the damper when the first gas stream is not flowing, comprising:

a generally cylindrical housing having a first gas stream inlet at one end and a second gas stream inlet at the other end of the housing;

a floating piston mounted within the housing having a cylindrical outer wall;

a gas stream outlet in the housing spaced from said first inlet between said first and second inlets; and biasing means urging the piston toward said first inlet, said piston being selectively displaced by the buoyant force of the first gas stream flowing through the housing between said first inlet and said outlet to position it in partial covering relationship with respect to the outlet to vary the discharge rate of the first gas stream from the housing commensurate with the pressure in the gas stream downstream of the damper, and said biasing means being operative to position said piston between said first inlet and said outlet so that substantially the entire length of said cylindrical outer wall cooperates with the housing to close-off said first inlet while accommodating an essentially unobstructed flow of the second gas stream through the housing between said second inlet and said outlet when said first gas stream is not flowing.

2. The damper according to claim 1; and said housing having a plurality of said outlets laterally aligned about the periphery of the housing.

3. The damper according to claim 1; and
said housing having an axially extending guide rod secured between the ends of the housing; and
said piston having a tubular sleeve slidably mounted on the rod to retain the piston in free floating concentric alignment with the housing.

4. The damper according to claim 1; and
said housing being generally vertically aligned and said piston having a hollow interior open at the top; and
said interior containing a selectively weighted ballast providing said biasing means.

5. The damper according to claim 1; and
said damper being of a welded metal construction.

* * * * *